US010533587B2

(12) United States Patent
Bargh (10) Patent No.: US 10,533,587 B2
(45) Date of Patent: Jan. 14, 2020

(54) VALVE SYSTEM (71) Applicant: BIFOLD FLUIDPOWER LIMITED, Manchester (GB)

(72) Inventor: Adam Bargh, Lancashire (GB)

(73) Assignee: Bifold Fluidpower Limited, Manchester (GB)

(*) Notice: Subject to any disclaimer, the term of this patent is extended or adjusted under 35 U.S.C. 154(b) by 75 days.

(21) Appl. No.: 15/773,257

(22) PCT Filed: Nov. 7, 2016

(86) PCT No.: PCT/GB2016/053477
§ 371 (c)(1),
(2) Date: May 3, 2018

(87) PCT Pub. No.: WO2017/077343
PCT Pub. Date: May 11, 2017

(65) Prior Publication Data
US 2018/0320713 A1 Nov. 8, 2018

(30) Foreign Application Priority Data
Nov. 5, 2015 (GB) .................................. 1519581.1

(51) Int. Cl.
F15B 19/00 (2006.01)
F16K 37/00 (2006.01)
F15B 20/00 (2006.01)

(52) U.S. Cl.
CPC .......... *F15B 19/005* (2013.01); *F15B 20/008* (2013.01); *F16K 37/0075* (2013.01);
(Continued)

(58) Field of Classification Search
CPC .................. F15B 19/005; F15B 20/008; F15B 2211/6355; F16K 37/0075
See application file for complete search history.

(56) References Cited

U.S. PATENT DOCUMENTS 4,215,844 A * 8/1980 Bowen .................. F15B 1/02
251/28
4,261,450 A * 4/1981 Matsushima ......... B30B 15/142
192/12 C
(Continued)

FOREIGN PATENT DOCUMENTS

CN 102155470 7/2013
DE 4216075 11/1993
(Continued)

OTHER PUBLICATIONS

International Search Report and Written Opinion for Application No. PCT/GB2016/053477 dated Mar. 6, 2017, 10 pages.

*Primary Examiner* — Umashankar Venkatesan
(74) *Attorney, Agent, or Firm* — Michael Best & Friedrich LLP (57) ABSTRACT A valve system including a shuttle valve having first and second inlet channels connected respectively to first and second channels, a cavity, an outlet channel and a moveable element, the first and second inlet channels being in fluid communication with outlet channel via the cavity; wherein a moveable element is moveable within the cavity such that the position of the moveable element is determined by relative pressure levels in the first and second inlet channels, in a first position the movable element forming a seal between the moveable element and the first inlet channel, in a second position the moveable element forming a seal between the moveable element and the second inlet channel, and in a third position the moveable element being located between the first and second positions and allowing the passage of fluid from both the first and second channels.

20 Claims, 5 Drawing Sheets (52) U.S. Cl.
CPC .......... *F15B 2211/3052* (2013.01); *F15B 2211/30565* (2013.01); *F15B 2211/40592* (2013.01); *F15B 2211/8752* (2013.01); *F15B 2211/8755* (2013.01); *F15B 2211/8757* (2013.01)

(56) References Cited

U.S. PATENT DOCUMENTS

| | | | | |
|---|---|---|---|---|
| 4,280,397 | A | * | 7/1981 | Peveto .................. E21B 19/16 137/596.12 |
| 4,586,332 | A | * | 5/1986 | Schexnayder .......... E02F 9/123 60/468 |
| 4,870,892 | A | | 10/1989 | Thomsen et al. |
| 5,282,363 | A | * | 2/1994 | Ogawa .................. B60K 17/10 60/420 |
| 5,291,676 | A | * | 3/1994 | Beater .................. F15B 11/166 60/422 |
| 5,960,695 | A | * | 10/1999 | Aardema .............. F15B 11/006 137/596.17 |
| 2009/0145123 | A1 | * | 6/2009 | Hwang ................ F15B 11/003 60/466 |
| 2015/0152898 | A1 | | 6/2015 | Banay et al. |
| 2016/0288771 | A1 | | 10/2016 | De Vries et al. |
| 2017/0051768 | A1 | * | 2/2017 | Sauer .................... F15B 19/00 |
| 2019/0257328 | A1 | * | 8/2019 | Erikksson ............. B62D 5/091 |

FOREIGN PATENT DOCUMENTS

| | | | | |
|---|---|---|---|---|
| FR | 2754571 | | 4/1998 | |
| WO | WO2015155786 | * | 10/2015 | ............. F16K 31/12 |

\* cited by examiner

VALVE SYSTEM

RELATED APPLICATION DATA

The present application is a U.S. National Phase application of PCT/GB2016/053477 filed Nov. 7, 2016, which claims priority to Application No. GB 1519581.1, filed Nov. 5, 2015, the entire contents of both of which are herein incorporated by reference.

BACKGROUND OF THE INVENTION

The present invention relates to a valve system. The valve system may be a Partial Stroke System for facilitating a Partial Stroke Test using an Emergency Shutdown (ESD) valve actuator.

SUMMARY OF THE INVENTION

Across a wide range of industries such as oil & gas, processing plants require an ESD valve to immediately shutdown a plant or process if required in an emergency. Such valves remain open during general process operations and must close in the event of an emergency, for instance an out-of-control process.

There exists a requirement to periodically test such ESD valves without initiating a full shutdown procedure. The test should verify that the ESD valve will function correctly if required in an emergency.

Given that the majority of ESD valves remain open during general operations, one of the most common examples of ESD valve failure is due to stiction. Stiction is static friction force which has to be overcome in order for one surface to move relative to another surface. In the case of an ESD valve, stiction occurs between the valve seat and the internal face of the ESD valve. After prolonged periods of the valve remaining open, stiction forces can arise. The accumulation of contaminants from fluid flowing in the valve may for example cause stiction. Should an ESD be required, it may not be possible to close an ESD valve due to the build-up of stiction forces, potentially leading to a catastrophic incident. One method which can be employed to reduce the risk of stiction-related failure in ESD valves is a Partial Stroke Test.

A Partial Stroke Test refers to a method whereby an ESD valve is rotated by a specific, small angle such as between 10°-15°. By rotating the ESD valve, the valve seat is moved relative to the internal valve housing face, thereby overcoming any stiction forces that were present. This ensures that the ESD valve is able operate reliably should it be required in an emergency.

When a Partial Stroke Test is performed it is desirable to avoid a so called spurious trip event. A spurious trip can occur when the pressure in a valve actuator is reduced in order to free a stuck valve. With the pressure reduced, once the valve does start to move it can snap shut as there is insufficient pressure in the ESD valve actuator to keep the ESD valve open.

Systems already exist for facilitating PSTs. Existing systems are primarily mechanical or remote solutions.

Mechanical solutions make use of a "hard stop" device whereby a purpose built actuator has an integrated, manually engaged travel stop or, alternatively, an add-on-type manually engaged stop which is mounted between the actuator and the ESD valve. The hard stop device is able to limit the actuator travel. In turn this limits the rotational movement, or closing, of the ESD valve. Such devices prevent a spurious trip during a Partial Stroke Test. However, they have a number of associated disadvantages. These include extensive operator training and detailed Partial Stroke Test procedures required for both engaging and disengaging the hard stop device. In addition, the hard stop limit must be disengaged quickly if an emergency occurs and ESD is required during a Partial Stroke Test.

Remote solutions are automated Partial Stroke Test devices which bleed a portion of the actuator air supply to regulate the actuator travel, thereby limiting the rotational movement of an ESD valve. Benefits include reduced operator training requirements, the availability of diagnostic data during testing and full automation if desired. Disadvantages include no hard travel limit stops (risking spurious over-travel of the ESD valve), reduced actuator output due to only a portion of the air supply being used (which may not be sufficient to free a stuck ESD valve) and the risk of a stuck ESD valve snapping open to an over-travel position, leading to a spurious trip.

It is an object of the present invention to mitigate or obviate a problem associated with known valve systems used for Partial Stroke Tests.

According to a first aspect of the present invention there is provided a valve system comprising:

a first channel and a second channel in a parallel arrangement, each channel having an upstream end and a downstream end;

an inlet valve arrangement connected to the upstream ends of the channels and configured to selectively allow the passage of a fluid through only the first channel, only the second channel, or through both channels;

at least two independently controllable valves placed in a series arrangement along the first channel and at least two independently controllable valves placed in a series arrangement along the second channel; and a shuttle valve connected to downstream ends of the first and second channels, the shuttle valve comprising first and second inlet channels connected respectively to the first and second channels, a cavity, an outlet channel and a moveable element, the first and second inlet channels being in fluid communication with outlet channel via the cavity; wherein the moveable element is moveable within the cavity such that the position of the moveable element is determined by relative pressure levels in the first and second inlet channels, in a first position the movable element forming a seal between the moveable element and the first inlet channel, in a second position the moveable element forming a seal between the moveable element and the second inlet channel, and in a third position the moveable element being located between the first and second positions and allowing the passage of fluid from both the first and second channels.

The parallel arrangement of the first channel and the second channel, each with a series arrangement of two or more independently controllable valves placed along them provides redundancy. If a fault occurs in a valve located along one of the channels, the faulty channel can be sealed from the rest of the valve system to allow for the faulty valve to be replaced, without affecting the ability of the valve system to initiate an ESD if required. The inlet valve arrangement and shuttle valve provide a means to seal the faulty channel from the rest of the valve system. The shuttle valve automatically seals the downstream end of one of the channels. The inlet valve arrangement allows a user to limit the passage of flow to a single channel. The combination of the inlet valve arrangement and shuttle valve allows a channel to be sealed without leading to a spurious trip, whilst at the same time allowing an ESD to be initiated if required. Due to the parallel arrangement of channels, if one channel is exhausted for maintenance, the other can remain pressurised and so the ESD valve remains open. If a channel is exhausted the pressure inside the channel is taken to be close to atmospheric pressure, around 100 kPa.

The moveable element may be a ball.

The first inlet channel and the second inlet channel may be connected to outwardly tapering end surfaces of the cavity.

The moveable element may be located in a carriage which restricts movement of the moveable element to substantially a single direction.

The first and second inlets may be positioned such that the first and second inlets are at substantially the same height.

Pressure switches may be placed downstream of the independently controllable valves.

One or more volume boosters may be connected downstream of the shuttle valve.

An outlet channel from the one or more volume boosters may be connected to primary pistons of a valve actuator.

An outlet channel from the shuttle valve may be connected to primary pistons of a valve actuator.

The valve actuator may be connected to an emergency shutdown valve.

A display may be configured show the status of the system during a test and indicate the rotational position of an actuator.

A controller may be configured to control valves of the valve system.

The controller may include a memory configured to store output data received during testing of the valve system.

The input valve arrangement, the individually controllable valves, and the shuttle may be individually enclosed in explosion proof housings.

The valve system may include one or more additional channels connected in a parallel arrangement to the first and second channels.

According to a second aspect of the invention there is provided a method of testing a valve system according to the first aspect of the invention, the method comprising actuating the inlet valve arrangement to allow the passage of fluid through both the first channel and the second channel;

separately actuating the at least two independently controllable valves in the series arrangement along the first channel whilst monitoring the pressure switches downstream of those valves; and separately actuating the at least two independently controllable valves in the series arrangement along the second channel whilst monitoring the pressure switches downstream of those valves.

The valve system may form part of a partial stroke system which further comprises backstop pistons of a valve actuator which are controlled by two backstop piston control valves, and the method may further comprise:

energising both backstop piston control valves;

de-energising and then energising one of the backstop piston control valves;

de-energising and then energising the other backstop piston control valves; and de-energising both backstop piston control valves.

The partial stroke system may be connected to an emergency shutdown assembly which comprises an emergency shutdown valve controlled by primary pistons, the positions of the primary pistons being determined by the valve system, and the method may further comprise:

energising both backstop piston control valves;

de-energising the independently controllable valves; and energising the independently controllable valves.

The independently controllable valves may be de-energised then energised a plurality of times.

Once de-energising and energising the independently controllable valves has been completed, the backstop piston control valves may be de-energised.

BRIEF DESCRIPTION OF THE DRAWINGS

Specific embodiments of the present invention will now be described, by way of example only, with reference to the accompanying drawings in which.

DETAILED DESCRIPTION

Figure 1:
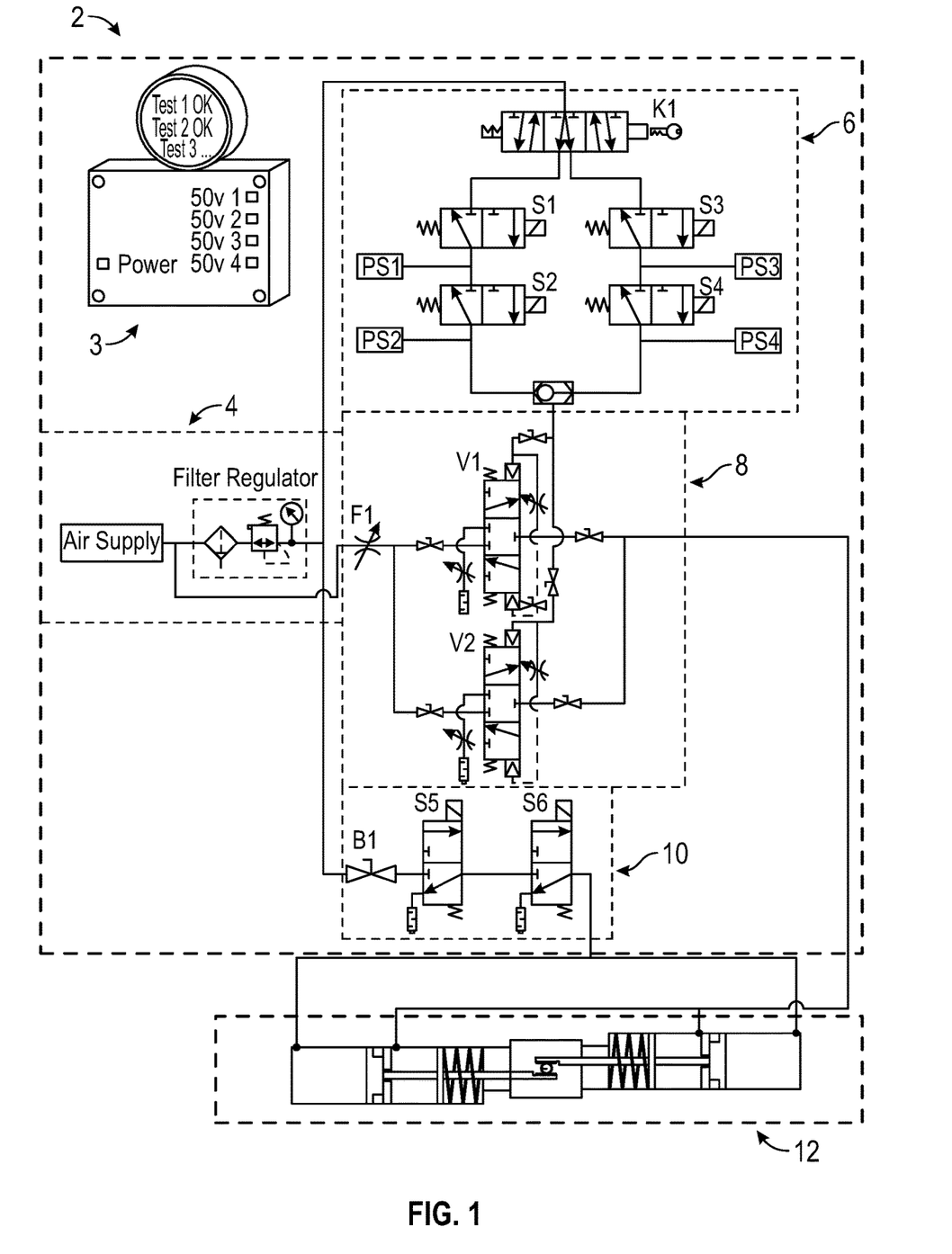
FIG. 1 schematically depicts a Partial Stroke System and Emergency Shutdown (ESD) assembly according to an embodiment of the invention.

FIG. 1 schematically depicts a Partial Stroke System 2 according to an embodiment of the invention. The Partial Stroke System 2 includes a control unit 3, an air supply and filter regulator system 4, a valve system 6, a volume booster system 8 and a backstop piston valve system 10. Also depicted is an Emergency Shutdown (ESD) assembly 12.

Figure 2:
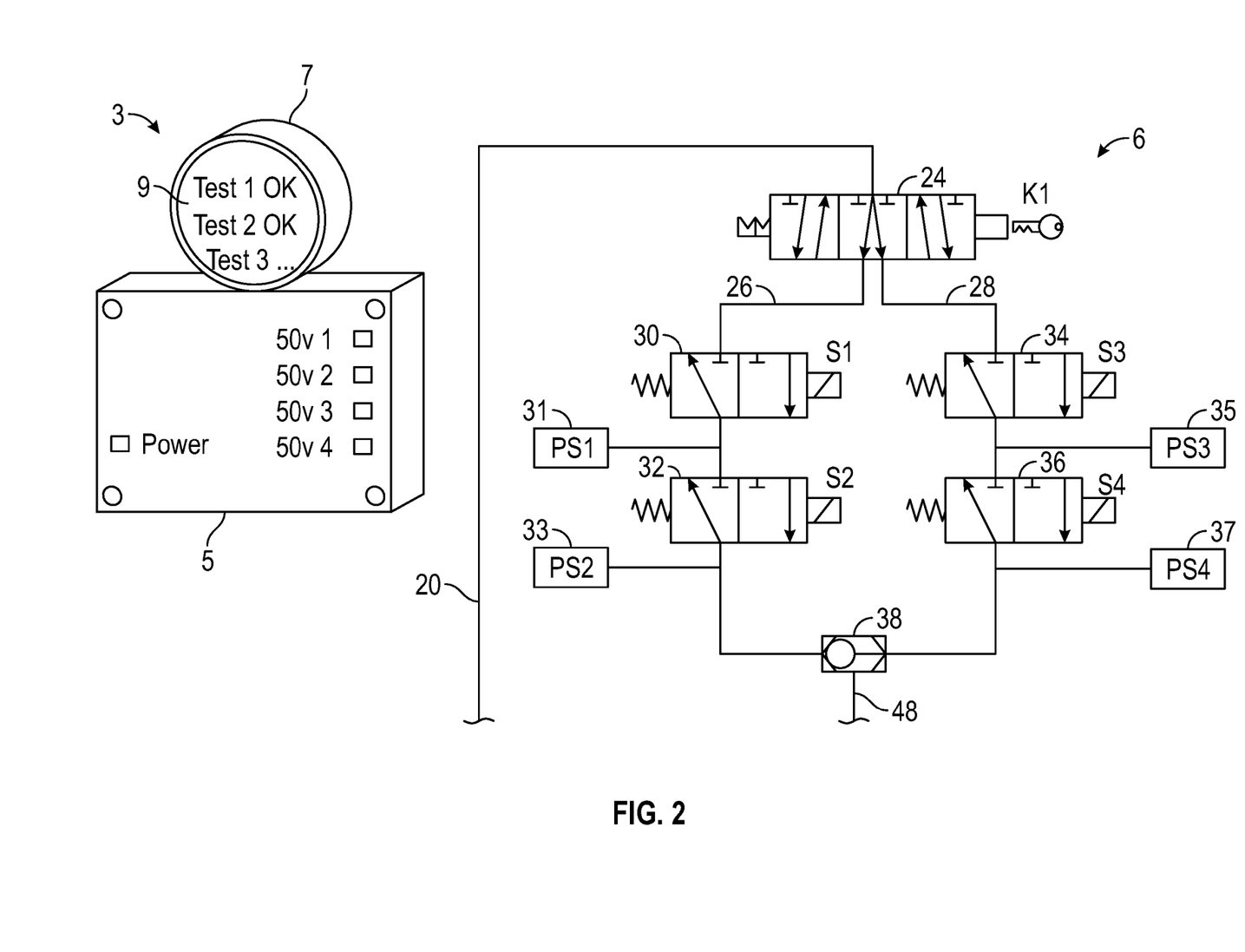
FIG. 2 schematically depicts a display and valve system.

FIG. 2 schematically depicts the control unit 3 and valve system 6 in an enlarged view. The control unit 3 comprises a junction box 5, a controller 7 and a display screen 9 (the display screen is located in front of the controller, which may for example comprise a processor and a memory). The display screen 9 indicates the test status of individually monitored components during a Partial Stroke Test. The display screen 9 also displays information relating to a malfunction of the monitored components, including indicating which component is malfunctioning. A malfunctioning component (e.g. a solenoid) can then be isolated by a user and replaced, following which the controller 7 may perform a test of that component to verify that it is working correctly. Once this verification has been received the component is then reconnected to the rest of the system.

The control unit 3 is connected to electronic valves and sensors of the Partial Stroke System 2, and controls whether the valves are energised or de-energised during operations and also during a test sequence. No connections to the control unit 3 are shown in FIGS. 1 and 2 in the interest of simplicity. The display screen 9 is able to display the rotational position of an ESD valve within the ESD assembly 12 using a position feedback module mounted on the ESD assembly 12. The position feedback module may for example be in the form of a variable resistor, which acts to convert the rotational position of the ESD valve to a 4-20 mA signal which is interpreted by the controller 7.

In an embodiment, the enclosure of the junction box 5 is an Increased Safety Enclosure. This means a spark cannot be created in the enclosure. The enclosure of the controller 7 and display screen 9 is explosion-proof. This combination of enclosures means the overall control unit 3 is explosion-proof. This is the same throughout the Partial Stroke System 2 wherein all individual components are enclosed in explosion-proof housings. The benefit of such an arrangement is that if a fault develops and a component requires replacing in-situ, which may be an explosive environment, the component can be replaced safely. If a component, for instance an independently controllable valve, requires replacing the first step is to de-energise the valve. The explosion-proof box in which it is housed is then opened, and the valve is disconnected electronically and pneumatically from the system. A replacement valve is then installed, following which the explosion-proof box is closed. The replacement valve is energised and normal operation of the valve system resumes. Because components are individually enclosed in explosion proof housings, components can be replaced whilst the system remains in an explosion-proof state. The explosion-proof housing of components means the Partial Stroke System 2 may be Ex d certified.

Figure 3:
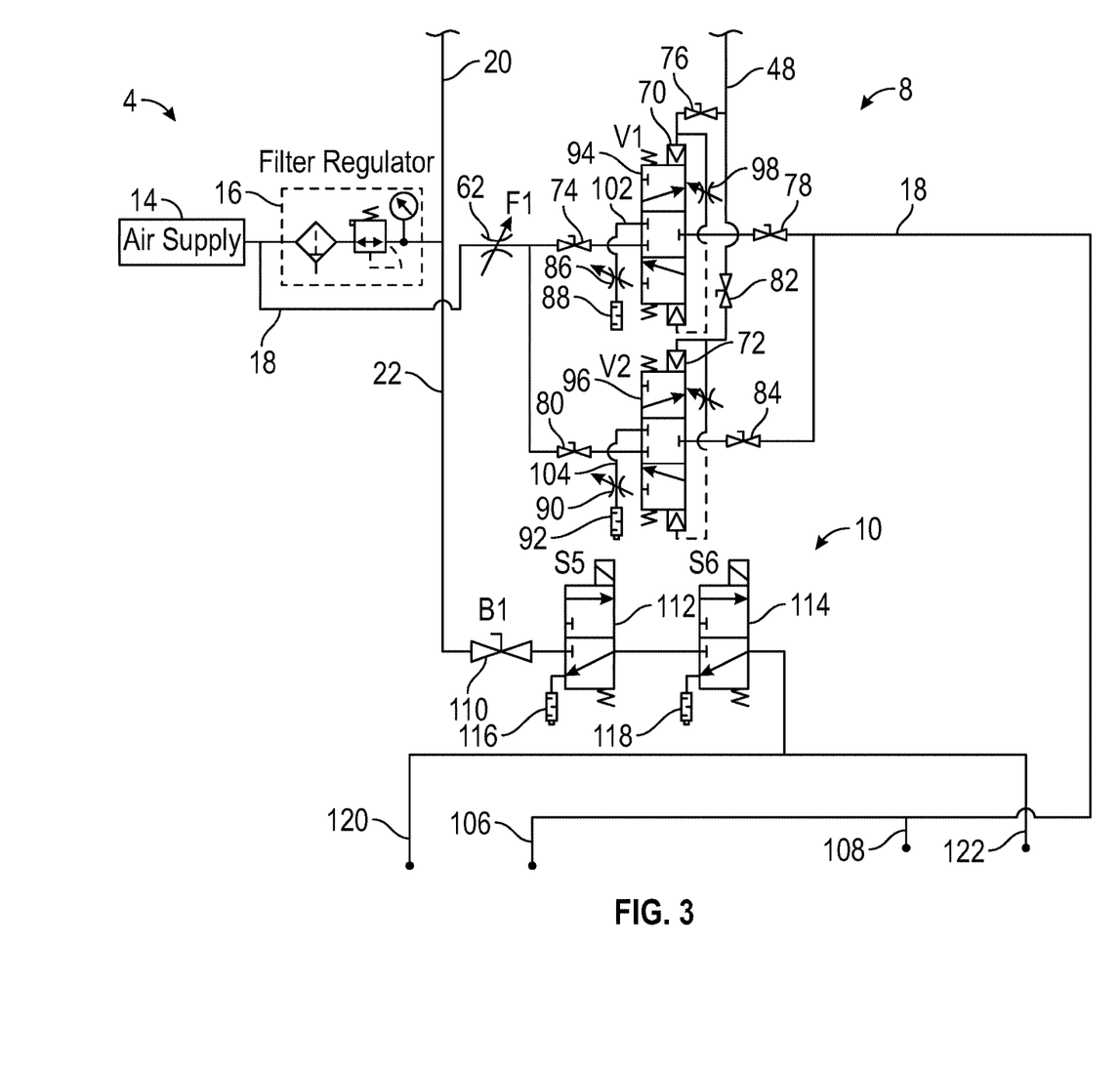
FIG. 3 schematically depicts an air supply & filter regulator, volume booster and backstop piston valve systems.

FIG. 3 schematically depicts the air supply & filter regulator 4, volume booster 8 and backstop piston valve systems 10. The air supply and filter regulator system 4 includes an air supply 14 configured to provide pressurised air to the rest of the system. The exact air pressure will vary depending on the area of the system it is supplied to but, for instance, the air pressure upstream of the volume booster system 8 may be around 400 kPag or more. The air pressure upstream of the volume booster system 8 may for example be up to around 1000 kPag. In general, the air pressure may be between 400 kPag and 1000 kPag. Air may be supplied at some other suitable pressure. The filter regulator 16 is downstream of the air supply 14. Downstream of air supply 14 but upstream of the filter regulator 16 is a primary piston feed channel 18 which provides pressurised air to the volume booster system 8. The primary piston feed channel 18 bypasses the filter regulator 16. This is done because the volume booster system 8 includes an in-built filter function. Downstream of the filter regulator 16, air passes to a valve system feed channel 20 and a backstop piston feed channel 22. The valve system feed channel 20 and backstop piston feed channel 22 supply pressurised air to the valve system 6 and backstop piston valve system 10 respectively.

Returning to FIG. 2, the valve system 6 to which the valve system feed channel 20 is connected comprises: an inlet valve arrangement 24, a pair of flow channels 26, 28, four independently controllable valves 30, 32, 34, 36 and a shuttle valve 38. The pair of flow channels may be referred to as a first channel 26 and second channel 28.

The inlet valve arrangement 24 is connected downstream of the valve system feed channel 20 and splits the valve system feed channel 20 flow into the first channel 26 and second channel 28. The first channel 26 and second channel 28 are in a parallel arrangement. The four independently controllable valves 30, 32, 34, 36 are arranged such that two of the independently controllable valves 30, 32 are placed in a series arrangement along the first channel 26 and two of the independently controllable valves 34, 36 are placed in a series arrangement along the second channel 28. The two independently controllable valves placed in a series arrangement along the first channel 26 are a first channel first valve 30 and a first channel second valve 32. The two independently controllable valves placed in a series arrangement along the second channel 28 are a second channel first valve 34 and a second channel second valve 36. Downstream ends of the first and second channels 26, 28 are connected to inlet channels 44, 46 of the shuttle valve 38.

The inlet valve arrangement 24 is configured to selectively allow the passage of air through only the first channel 26, only the second channel 28, or through both flow channels. This allows the inlet valve arrangement 24 and the shuttle valve 38 to isolate one of the flow channels, i.e. the first channel 26 or the second channel 28. If one of the independently controllable valves 30, 32, 34, 36 requires replacing, this can be achieved whilst the valve system 6 remains functional and maintains pressure in the working channel. This is advantageous because the system remains operational such that an ESD could be performed in an emergency (the working, pressurised channel could be exhausted if required), whilst at the same time allowing the faulty valve to be replaced. This avoids unnecessary process downtime and the associated cost.

The first and second valves 30, 32 of the first channel are placed in series along the first channel 26 to provide redundancy in the first channel. If a fault occurs in one of the first channel first or second valves 30, 32 whilst the second channel 28 is sealed for repair, the other first channel first or second valve 30, 32 will still allow the first channel 26 to be exhausted if an ESD was required. Likewise, the second channel first and second valves 34, 36 are placed in series along the second channel 28 to provide redundancy in the second channel 28. If a fault occurs in one of the second channel first or second valves 34, 36 whilst the first channel 26 is sealed for repair, the other second channel first or second valves 34, 36 will still allow the second channel 28 to be exhausted if an ESD was required.

Pressure switches 31, 33 are respectively connected downstream of the first and second valves 30, 32 of the first channel 26. These are referred to herein as first channel first and second pressure switches 31, 33 respectively. Similarly, pressure switches 35, 37 are respectively connected downstream of the first and second valves 34, 36 of the second channel 28. These are referred to herein as second channel first and second pressure switches 35, 37. This positioning of the pressure switches 31, 33, 35, 37 along the first and the second channels 26, 28 allows verification that each of the independently controllable valves 30, 32, 34, 36 are functioning correctly. If one of the independently controllable valves 30, 32, 34, 36 is malfunctioning, the pressure switches 31, 33, 35, 37 allow for the specific malfunctioning valve to be identified. That valve can then be repaired or replaced.

The combination of the redundancies, i.e. the first and second channels 26, 28 in a parallel arrangement and the series arrangement of independently controllable valves 30, 32, 34, 36, means the Partial Stroke System 2 is able to continue functioning correctly in the event of components developing faults. This provides a sufficiently low risk of system failure to allow the Partial Stroke System 2 to attain SIL3 certification.

Figure 4:
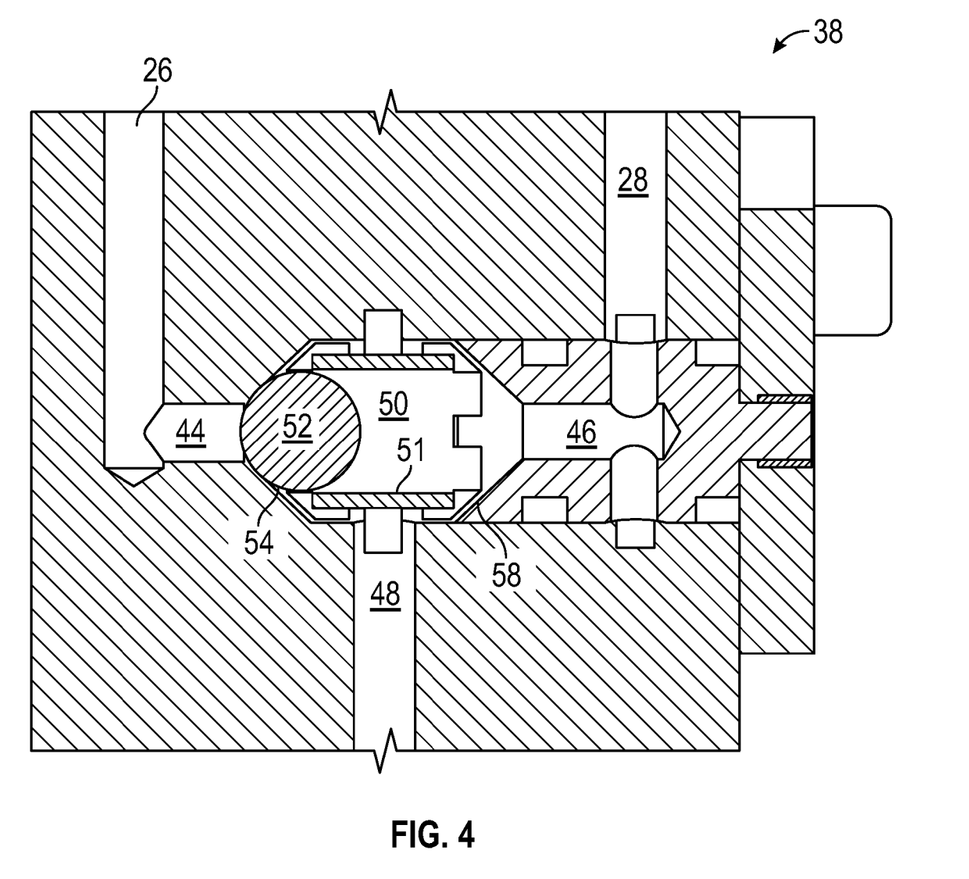
FIG. 4 is a cross-section view of a shuttle valve assembly.

FIG. 4 depicts the shuttle valve 38. The shuttle valve 38 comprises two inlet channels 44, 46 (a first inlet channel 44 and a second inlet channel 46), an outlet channel 48, an internal cavity 50, a ball carriage 51, a moveable ball 52 and internal frustoconical surfaces 54, 58.

Within the shuttle valve 38 both inlet channels 44, 46 are in fluid communication with the outlet channel 48 via the internal cavity 50. A moveable ball 52 is placed within the ball carriage 51, which in turn is placed within the cavity 50. The cavity 50 has a frustoconical surface 54 at a first end and a frustoconical surface 58 at a second end.

The shuttle valve 38 is connected to downstream ends of the first and the second channels 26, 28 by first and second inlet channels 44, 46. The first and second inlet channels 44, 46 connect to the cavity 50 within the shuttle valve 38. The outlet channel 48 is also connected to the cavity 50. The ball carriage 51 is located within the cavity 50. The ball carriage 51 limits the movement of the moveable ball 52 such that the moveable ball 52 is only able to move in substantially a single direction (horizontal movement in the illustrated embodiment). The ball carriage 51 prevents the moveable ball 52 becoming lodged in the outlet channel 48. The cavity 50 limits the lateral range of travel of the moveable ball 52. The moveable ball 52 position is determined by the relative pressure levels in the inlet channels 44, 46. The pressure levels in the inlet channels 44, 46 are very similar during normal operation of the valve system 6, and the moveable ball 52 will come to rest in a central portion of the internal cavity 50, roughly equidistant from both inlet channels 44, 46. Thus, both inlet channels 44, 46 are in fluid communication with the outlet channel 48. If, however, one of the air pressures in the inlet channels 44, 46 changes significantly relative to the other, the moveable ball 52 is forced toward the lower pressure inlet 44, 46 and will come to rest at one end of the internal cavity 50 and will contact the internal frustoconical surfaces 54 or 58. As a result of the moveable ball 52 contacting the frustoconical surfaces 54 or 58, the moveable ball 52 forms part of a seal between the moveable ball 52 and the lower pressure inlet channel 44, 46. Hence, the lower pressure inlet channel 44, 46 is isolated at the downstream end from the other inlet channel 44, 46 and the outlet channel 48, by means of a seal. The frustoconical surfaces 54, 58 may be also polished to a fine surface finish to improve the seal. In FIG. 4 the moveable ball 52 is in a position caused by the air in the first inlet channel 44 being at a lower pressure than the air in the second inlet channel 46. This causes the moveable ball 52 to seal the first inlet channel 44 from the second inlet channel 46 and the outlet channel 48. Hence, the downstream end of the first inlet channel 44 and so the downstream end of the first inlet channel 26 are isolated by the seal formed between the moveable ball 52 and the frustoconical surface 54.

The shuttle valve 38 can have any orientation (it does not need to be in the depicted horizontal orientation). This is possible due to the moveable ball 52 being sufficiently small that the mass of the moveable ball 52 does not significantly affect its free movement. The moveable ball 52 can be reduced in size as a result of the low air flow rate through the inlet channels 44, 46. The air flow rate in the inlet channels 44, 46 is relatively low because the volume booster system 8 amplifies the flow rate of this pilot signal for use in the ESD valve actuator 124. The air flow from the shuttle valve 38 does not need to be large to operate the volume booster system 8. It is the volume booster system 8, with a larger flow rate, which operates the ESD assembly 12.

The moveable ball 52 is one example of a moveable element which could be used by the shuttle valve 38. Other moveable elements which could be used include for example a dicone (revolved rhombus or two identical cones joined about the base) which is arranged to slide along a longitudinal axis of the cavity (for example guided by a guide rail). The moveable element may for example be a body which has a substantially continuous outer surface. The moveable element may be a body which does not include a cavity. The moveable element may for example be constructed such that its shape is substantially unchanged when pressure is applied to one side of it (although the moveable body may include some resilience and thus may deform slightly under pressure).

The frustoconical surfaces 54, 58 are one example of a range of possible outwardly tapering surfaces between the first and second inlet channels 44, 46 and the cavity 50. For instance, the surfaces could be trumpet-shaped, that is to say a cross-section would show arcuate edges in place of the otherwise straight edges of the frustoconical surface.

In general, the moveable element may have any shape that will form a seal against the outwardly tapering surface of the first inlet channel of the cavity, and any shape that will form a seal against the outwardly tapering surface of the second inlet channel of the cavity. It is not essential that the moveable element is symmetric about a plane perpendicular to the longitudinal axis of the cavity (for example the moveable element may have different shapes on either side of that plane). It is not essential that the outwardly tapering surfaces of the first and second inlet channels have the same shape (each may have any suitable outwardly tapering shape that will form a seal with the moveable element).

The shuttle valve 38 represents a simple, cost effective and safe sealing arrangement which is both passive and automatic in operation. The single moving part, the movable ball 52, within the shuttle valve 38 makes it an inherently safe solution to the automatic and rapid sealing of a channel (the first inlet channel 44 or the second inlet channel 46). This is because, provided that the moveable ball 52 maintains its integrity, the shuttle valve 38 can be expected to continue to function correctly. If an alternative sealing arrangement was implemented in place of the shuttle valve 38, for instance a solenoid-actuated valve, a malfunction could result in one of two failure modes.

In a first failure mode, the solenoid valve may stick in a central position such that both the first inlet channel 44 and the second inlet channel 46 are in fluid communication with the shuttle valve outlet channel 48. In this instance, if a fault were to develop in the first channel 26 or the second channel 28, the solenoid valve would not be able to seal and so isolate the faulty channel. For example, if the first independently controllable valve 30 of the first channel 26 were to fail in an open position, this would create a leakage flow path for the pressurised air to escape to the atmosphere. In these circumstances, a leakage path would be created through the faulty channel and this would reduce the air pressure in the shuttle valve outlet channel 48. Pressurised air would continue to be provided through the second channel 28, but the leakage might be such that the net pressure is not sufficiently high to keep the ESD valve in an open configuration, and thus might result in a spurious trip event.

In a second failure mode, the solenoid valve may incorrectly isolate the first inlet channel 44 or the second inlet channel 46. For example, the solenoid valve may fail in a position in which the first inlet channel 44 is sealed. If whilst the first inlet channel 44 is sealed a fault was to develop upstream of the second inlet channel 46, a leakage path for the pressurised air would be created. This would lead to a significant loss of pressure in the shuttle valve outlet channel 48, causing the closure of the ESD valve and so a spurious trip event.

As explained above, due to the simple construction of the shuttle valve 38 and its passive and automatic action, the likelihood of any of the aforementioned failure modes is very low. Instead, in the event of a fault occurring upstream of the first or the second inlet channel 44, 46 the shuttle valve 38 automatically seals and so isolates the faulty channel. With the faulty channel isolated, the other channel remains operational and maintains pressure in the system. Furthermore, because the moveable ball 52 is in a position which seals the faulty channel, it does not interfere with operation of the operational channel, and as a result if an ESD is required then opening the independently controllable valves of the operational channel will always vent the primary piston chambers 138a, 138b to atmosphere. ESD will therefore always be achieved and is not blocked by the shuttle valve 38. Hence, an ESD is always possible if required, but does not occur unnecessarily.

Returning to FIG. 3, the primary piston feed channel 18 and the shuttle valve outlet channel 48 are connected to the volume booster system 8. The volume booster system 8 comprises an inlet flow control valve 62, a first volume booster 94 and a second volume booster 96. Also present is a first volume booster exhaust line 102, a first exhaust flow control valve 86 and a first breather 88. A second volume booster exhaust line 104, a second exhaust flow control valve 90 and a second breather 92 are also included in the volume booster system 8. Also located within the volume booster system 8 are first volume booster isolation valves 74, 76, 78 and second volume booster isolation valves 80, 82, 84 and first and second volume booster bypass needles 98, 100. The first and second volume boosters 94, 96 have first and second volume booster pilot inlets 70, 72.

The use of volume boosters in the Partial Stroke System 2 is beneficial because it means the same valve system 6 can be used for a wide range of Emergency Shutdown valves, and thus a wide range of valve actuator sizes. That is, the size of the valves in the valve system 6 does not need to be changed for different sizes of Emergency Shutdown valve. Other components such as the volume boosters 94, 96 are scaled as appropriate for different sizes of Emergency Shutdown valve.

The primary purpose of the volume booster system 8 is to increase the air flow rate in the primary piston feed channel 18 downstream of the volume booster system 8, such that the air which passes to the ESD assembly 12 is at a higher flow rate than the air in the shuttle valve outlet channel 48. The operation of the volume booster system 8 is analogous to that of a transistor. Air at a low flow rate from the shuttle valve outlet channel 48 enters the volume booster pilot inlets 70, 72. The low flow rate air in the shuttle valve outlet channel 48 is the pilot signal which triggers the passage of air at a higher flow rate in the primary piston feed channel 18 downstream of the volume booster system 8. The volume boosters 94, 96 are responsible for allowing the passage of the higher flow rate air into the downstream primary piston feed channel 18.

The volume boosters 94, 96 are placed in a parallel arrangement. The primary piston feed channel 18 is connected to the first volume booster 94 and second volume booster 96 via an inlet flow control valve 62. The shuttle valve outlet channel 48 is also connected to the volume boosters 94, 96 via first and second volume booster pilot inlets 70, 72.

The inlet flow control valve 62 is placed along primary piston feed channel 18 and upstream of the volume boosters 94, 96 to provide a means to control the speed of response of the volume boosters 94, 96 to a pilot signal from the shuttle valve outlet channel 48, received via the first and second volume booster pilot inlets 70, 72.

The first volume booster isolation valves 74, 76, 78 provide a means to isolate the first volume booster 94 from the volume booster system 8 for maintenance. The second volume booster isolation valves 80, 82, 84 provide a means to isolate the second volume booster 96 from the volume booster system 8 for maintenance. The first volume booster 94 is able to exhaust pressurised air to the atmosphere by means of the first volume booster exhaust line 102. The first volume booster exhaust line 102 is connected to the first exhaust control valve 86 which allows the speed at which the flow is exhausted from the first volume booster 94 to be controlled. A first breather 88 is connected downstream of the first exhaust control valve 86 along the first volume booster exhaust line 102 to reduce the noise resulting from the exhaustion of air. Similarly, the second volume booster 96 is able to exhaust pressurised air to the atmosphere by means of the second volume booster exhaust line 104. The second volume booster exhaust line 104 is connected to the second exhaust control valve 90 which allows the speed at which the flow is exhausted from the second volume booster 96 to be controlled. A second breather 92 is connected downstream of the second exhaust control valve 90 along the second volume booster exhaust line 104 to reduce the noise resulting from the exhaustion of air. The first and second volume booster bypass needles 98, 100 are used for damping in instances where the pilot signal continually varies. In this instance, however, the pilot signal from the shuttle valve outlet channel 48 is either on or off and so the first and second volume booster bypass needles 98, 100 remain shut. Downstream of the volume booster system 8, the primary piston feed channel 18 divides into two channels, a first primary piston feed channel 106 and a second primary piston feed channel 108.

Volume boosters are described in detail in GB2459724, which is incorporated herein by reference.

The backstop piston feed channel 22 is connected to the backstop piston valve system 10. The backstop piston valve system 10 comprises a backstop piston isolation valve 110 and a pair of backstop piston control valves, a first backstop piston control valve 112 and a second backstop piston control valve 114. Each of the backstop piston control valves 112, 114 have an exhaust line and breather 116, 118.

The backstop piston feed channel 22 first connects to the backstop piston isolation valve 110. Downstream of the backstop piston isolation valve 110, the first backstop piston control valve 112 and the second backstop piston control valve 114 are connected in a series arrangement. The first backstop piston control valve 112 is connected to a first exhaust line and breather 116. The second backstop piston control valve 114 is connected to a second exhaust line and breather 118. Further downstream of the second backstop piston control valve 114 the backstop piston feed channel 22 divides into two channels, a first backstop piston feed channel 120 and a second backstop piston feed channel 122, which supply air to each of two ends of the ESD assembly 12.

The backstop piston isolation valve 110 provides a means to isolate the downstream backstop piston control valves 112, 114 from the air supply and filter regulator system 4, for maintenance (and from the valve system 6). The backstop piston control valves 112, 114 are placed in a series arrangement to provide redundancy. If one of the backstop piston control valves 112, 114 malfunctioned and could not be closed (de-energised), the other would remain able to close (de-energise) and exhaust air from the backstop piston feed channel 22 downstream of the backstop piston valve system 10 (thereby moving an ESD valve actuator 124 and closing the ESD valve).

Figure 5A:
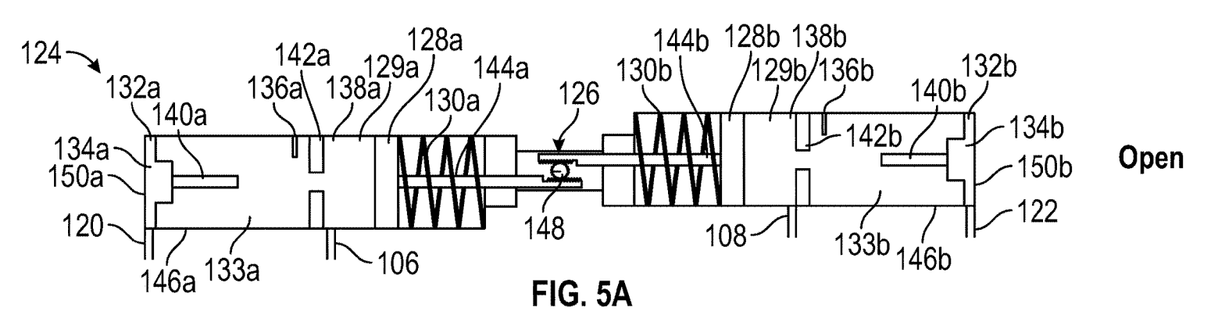
FIGS. 5a-5c schematically depict a valve actuator in an open configuration, Partial Stroke Test (partially closed configuration) and ESD configuration.
Figure 5B:
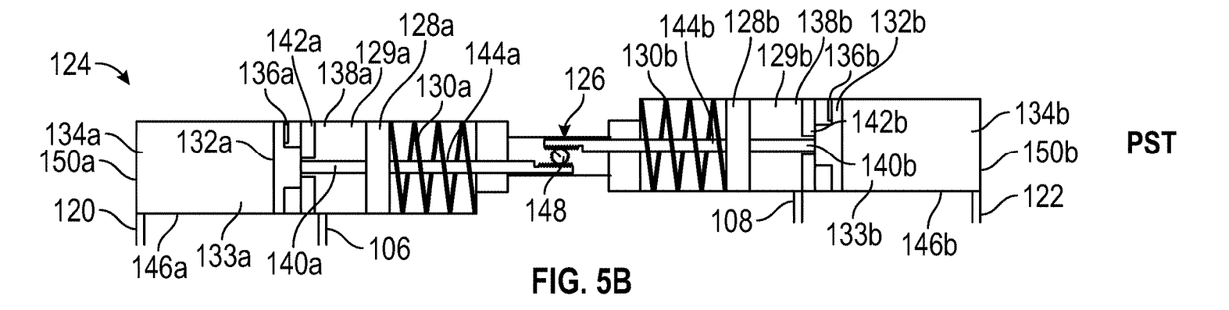
Figure 5C:
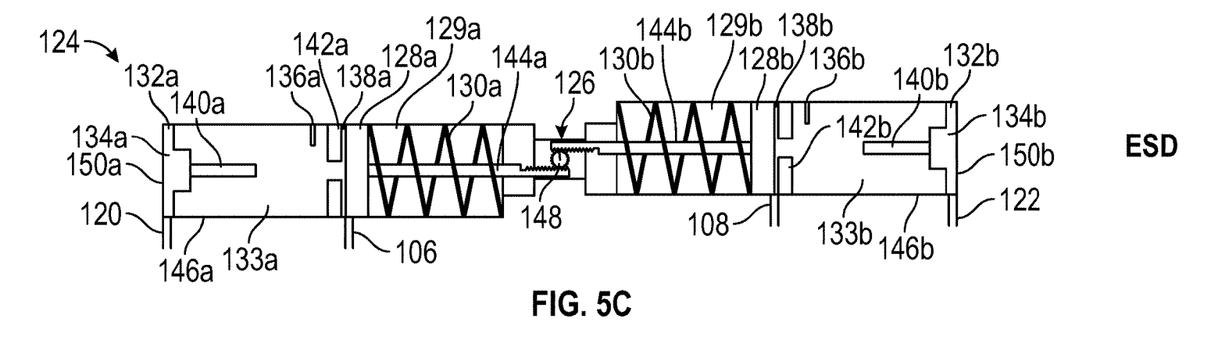

Referring to FIGS. 5a-5c, the Emergency Shutdown (ESD) assembly 12 comprises an ESD valve actuator 124 and ESD valve (not pictured). The ESD valve actuator 124 comprises a torque module 126 and primary piston pushrods 144a, 144b which have teeth at their inner ends that engage with the torque module 126 via a spur gear 148 in a rack and pinion style motion. The spur gear 148 is rotationally connected to the ESD valve such that rotation of the spur gear 148 causes rotation of the ESD valve. The primary piston pushrods 144a, 144b are connected to primary pistons 128a, 128b such that a first primary piston pushrod 144a moves with a first primary piston 128a. Likewise, a second primary piston pushrod 144b moves with a second primary piston 128b. The primary pistons 128a, 128b move linearly within piston housings 146a, 146b (which may be cylindrical in cross-section). The primary pistons 128a, 128b and primary piston pushrods 144a, 144b are biased away from the torque module 126 by springs 130a, 130b. The outer position of the primary pistons 128a, 128b and primary piston pushrods 144a, 144b is limited by collars 142a, 142b which are located within the piston housings 146a, 146b. The position of the primary pistons 128a, 128b and so primary piston pushrods 144a, 144b is determined by the air pressure within primary piston chambers 138a, 138b. The primary piston chambers 138a, 138b are the volumes between the outer face of the primary pistons 128a, 128b and an inner face of backstop pistons 132a, 132b. The primary piston chambers 138a, 138b are connected to the first and second primary piston feed channels 106, 108 respectively. The primary pistons 128a, 128b each sweep through a first volume 129a, 129b in a respective primary piston chamber 138a, 138b during the range of motion between the open configuration (FIG. 5a) and the ESD configuration (FIG. 5c).

Located further outward from the primary pistons 128a, 128b are the backstop pistons 132a, 132b. The backstop pistons 132a, 132b are connected to backstop piston pushrods 140a, 140b. The backstop pistons 132a, 132b are also located within the piston housings 146a, 146b. The linear position of the backstop pistons 132a, 132b is determined by the air pressure within backstop piston chambers 134a, 134b. The backstop piston chambers 134a, 134b are the volumes between the outer face of the backstop pistons 132a, 132b and the outer ends 150a, 150b of the piston housings. The backstop piston chambers 134a, 134b are connected to the first and second backstop piston feed channels 120, 122 respectively. The backstop pistons 132a, 132b each sweep through a second volume 133a, 133b during the range of motion between the partially open configuration (FIG. 5b) and the open or ESD configurations (FIGS. 5a and 5c). Located near the collars 142a, 142b and mounted to the piston housings 146a, 146b are proximity switches 136a, 136b. These switches detect when the backstop pistons 132a, 132b and so backstop piston pushrods 140a, 140b are at an inner position.

The primary piston chambers 138a, 138b are isolated from the backstop piston chambers 134a, 134b due to the backstop pistons 132a, 132b sealing against the piston housings 146a, 146b.

In operation, the torque module 126 converts the linear motion of the primary pistons 128a, 128b and primary piston push rods 144a, 144b into rotational motion via the spur gear 148. Since the spur gear 148 is rotationally connected the ESD valve (not pictured), the linear position of the primary pistons 128a, 128b controls the rotational position of the spur gear 148 and so controls the ESD valve. The spur gear 148 may be axially aligned with the ESD valve and directly connected to the ESD valve, or alternatively the spur gear 148 may be offset from the ESD valve and connected in another way.

The linear position of the primary pistons 128a, 128b is determined by the pressure of the air in the primary piston chambers 138a, 138b. The primary piston chambers 138a, 138b are connected to the first and second primary piston feed channels 106, 108, hence the pressure in these channels determines the linear position of the primary pistons 128a, 128b and so determines the rotational position of the ESD valve. The primary pistons 128a, 128b and primary piston pushrods 144a, 144b are biased outward from the torque module 126 by the springs 130a, 130b. This arrangement means that in the event of a pressure loss (e.g. due to a loss of power) the primary pistons 128a, 128b will move outward until they make contact with the collars 142a, 142b. The outer position of the primary pistons 128a, 128b, as limited by the collars 142a, 142b, corresponds with the complete closure of the ESD valve by the torque module 126.

The purpose of the backstop pistons 132a, 132b and backstop piston push rods 140a, 140b is to limit the primary pistons 128a, 128b and so primary piston push rods 144a, 144b travel during a Partial Stroke Test. This in turn limits the maximum rotational movement of the torque module 126 which also limits the rotational movement of the ESD valve to, for example, 10°-15°. This is to prevent an event such as a spurious trip occurring during a Partial Stroke Test. The backstop piston push rods 140a, 140b, which are connected to the backstop pistons 132a, 132b, limit the travel of the primary pistons 128a, 128b during a Partial Stroke Test, when inner faces of the backstop piston push rods 140a, 140b make contact with outer faces of the primary pistons 128a, 128b. The backstop piston proximity sensors 136a, 136b determine whether the backstop pistons 132a, 132b are at an inner position of the piston housing 146a, 146b, and thus engaged in a Partial Stroke Test ready state.

There are three modes of operation of the Partial Stroke System 2 and ESD assembly 12: normal (ESD valve open, see FIG. 5a), Partial Stroke Test (ESD valve limited to 10°-15° rotation, see FIG. 5b), and emergency shutdown (ESD valve closed, see FIG. 5c).

During the normal mode of operation, the ESD valve is in a fully open configuration as shown in FIG. 5a. During this mode, primary piston chambers 138a, 138b are pressurised and backstop piston chambers 134a, 134b are exhausted (not pressurised). The primary pistons 128a, 128b and primary piston pushrods 144a, 144b are at an inward linear position. The force on the primary pistons 128a, 128b from air pressure in the primary piston chambers 138a, 138b compresses the springs 130a, 130b. The springs 130a, 130b are not necessarily fully compressed when the primary pistons 128a, 128b are in their inner positions. The inner positions of the primary pistons 128a, 128b, as depicted in FIG. 5a, corresponds with the maximum rotational movement of the torque module 126. This opens the ESD valve to a fully open configuration.

Because the backstop piston chambers 134a, 134b are exhausted, the backstop pistons 132a, 132b and backstop piston pushrods 140a, 140b are at outward positions. In the outward position, the backstop pistons 132a, 132b make contact with the outer ends 150a, 150b of the piston housings 146a, 146b. This ensures that in the event of an ESD being required, there is no possibility that the backstop pistons 132a, 132b and the backstop piston pushrods 140a, 140b could prevent or limit the travel of the primary pistons 128a, 128b and primary piston pushrods 144a, 144b (which could prevent emergency shutdown being initiated by the ESD valve).

The Partial Stroke Test mode of operation is now described with reference to FIGS. 5a and 5b. There are two tests which are carried out before the Partial Stroke Test to confirm the Partial Stroke System 2 and ESD assembly 12 are functioning correctly. These are a backstop pistons test and a valve system test. These tests should be performed before the Partial Stroke Test to confirm the system is functioning as intended. In addition, before the Partial Stroke Test is begun the backstop pistons should be engaged (i.e. moved to their inner positions).

The backstop pistons test confirms the functionality of the backstop pistons 132a, 132b using the backstop piston valve system 10. The backstop pistons test also confirms the functionality of the first and second backstop piston control valves 112, 114. Prior to commencing the backstop pistons test, the ESD valve assembly has the configuration depicted in FIG. 5a (the ESD valve is fully open). In a first step of the test both the first and second backstop piston control valves 112, 114 are energised such that the backstop piston chambers 134a, 134b are pressurised. With the backstop piston chambers 134a, 134b pressurised, the backstop pistons 132a, 132b and backstop piston pushrods 140a, 140b move inwards (in the direction of the ESD valve). The movement of the backstop pistons 132a, 132b and backstop piston pushrods 140a, 140b to an inner position is confirmed by the backstop piston proximity sensors 136a, 136b. The first backstop piston control valve 112 is then de-energised, causing the backstop piston chambers 134a, 134b to be exhausted. This, in turn, causes the outward movement of the backstop pistons 132a, 132b and backstop piston pushrods 140a, 140b. The backstop piston proximity sensors 136a, 136b confirm that the first backstop piston control valve 112 has been successfully de-energised.

The first backstop piston control valve 112 is then re-energised, resulting in the backstop piston chambers 134a, 134b becoming pressurised and so the inward movement of the backstop pistons 132a, 132b and backstop piston pushrods 140a, 140b as confirmed by backstop piston proximity sensors 136a, 136b. This confirms the first backstop piston control valve 112 is functioning correctly. The same test sequence is subsequently carried out for the second backstop piston control valve 114 (i.e. the second backstop piston control valve 114 is de-energised and then re-energised). Finally, to complete the backstop pistons test, both the first and second backstop piston control valves 112, 114 are de-energised, the backstop piston chambers 134a, 134b are exhausted, the backstop pistons 132a, 132b and backstop piston pushrods 140a, 140b move outward. This is confirmed by the backstop piston proximity sensors 136a, 136b. The backstop pistons test is then complete, and the backstop piston valve system is confirmed as functioning correctly.

The valve system test is carried out on the valve system 6. Throughout this test, the inlet valve arrangement 24 allows the passage of air into both the first and second flow channels 26, 28. In a first step of this test all of the independently controllable valves 30, 32, 34, 36 are initially energised such that the pressure switches 31, 33, 35, 37 all detect a pressure which is higher than atmospheric pressure. The first channel second valve 32 is first to be de-energised, which results in first channel second pressure switch 33 detecting atmospheric pressure but first channel first pressure switch 31 continuing to detect a higher-than-atmospheric pressure. The first channel first valve 30 is then de-energised, which results in the first channel second pressure switch 33 still detecting atmospheric pressure but additionally the first channel first pressure switch 31 now also detects atmospheric pressure. The first channel first valve 30 is then energised which results in the first channel first pressure switch 31 detecting higher-than-atmospheric pressure whilst the first channel second pressure switch 33 continues to detect atmospheric pressure. The first channel second valve 32 is then energised which results in the first channel first pressure switch 31 still detecting higher-than-atmospheric pressure and the first channel second pressure switch 33 now also detecting higher-than-atmospheric pressure.

The same test sequence is then carried out on the second flow channel 28 with the second channel first and second valves 34, 36 and the second channel first and second pressure switches 35, 37. On completion of the test sequence, the valve system is confirmed as functioning correctly.

Throughout the valve system test, the automatic sealing provided by the shuttle valve 38 means that the air pressure in the shuttle valve outlet channel 48 remains substantially constant. When an independently controllable valve is de-energised, creating a leakage path for the pressurised air to escape to the atmosphere, the moveable ball 52 of the shuttle valve 38 automatically moves to seal the leaking channel in which the independently controllable valve is located. Hence, the leakage path is sealed by isolating the leaking channel, and the other channel maintains pressure thereby keeping the ESD valve open and prevents a spurious trip.

Once the above tests have been completed, a final step before the Partial Stroke Test is engaging the backstop pistons. Backstop piston control valves 112, 114 are both energised, this pressurises backstop piston chambers 134a, 134b and moves backstop pistons 132a, 132b and backstop piston pushrods 140a, 140b inwards. This movement of the backstop pistons 132a, 132b is confirmed by the backstop piston proximity sensors 136a, 136b. The backstop pistons 132a, 132b and so backstop piston pushrods 140a, 140b are now in the Partial Stroke Test ready state, and will limit the travel of the primary pistons 128a, 128b, primary piston pushrods 140a, 140b, torque module 126 and thus ESD valve. The engagement of the backstop pistons to a Partial Stroke Test ready state is confirmed.

Once the backstop pistons test, valve system test and engaging of the backstop pistons have all been performed successfully, the system is ready to perform a Partial Stroke Test.

A Partial Stroke Test is defined as the de-energising and subsequent re-energising of the independently controllable valves 30, 32, 34, 36, causing the primary pistons 128a, 128b and primary piston pushrods 144a, 144b to move outward and then return to an inward position. The primary pistons 128a, 128b do not move to fully outward positions but instead merely move outward until they are stopped by the backstop piston pushrods 140a, 140b. The ESD valve assembly thus moves from the configuration shown in FIG. 5a to the configuration shown in FIG. 5b, and then back to the configuration shown in FIG. 5a. The movement of the primary pistons 128a, 128b and so primary piston pushrods 144a, 144b causes the ESD valve to close by, for example 10°-15°, and then return to a fully open position.

There may be some stiction which is holding the ESD valve in the open position. When the Partial Stroke Test is performed torque is applied to the ESD valve which overcomes the stiction and partially closes the valve. The force may be applied for a period of time before the stiction is overcome (e.g. a few hundred milliseconds). When the valve is closed after the Partial Stroke Test the stiction has been removed or reduced, and as a result the next time the ESD valve is to be moved to the open position it will move without delay (or with a delay of less than a hundred milliseconds). This ensures that the ESD is able to initiate emergency shutdown sufficiently rapidly when needed.

The Partial Stroke Test may be carried out several times, for example around 5 times. The independently controllable valves 30, 32, 34, 36 are cycled between de-energised and energised (so that they all operate at the same state). The cycling of independently controllable valves 30, 32, 34, 36 causes a cycling of the pressure level in the primary piston chambers 138a, 138b between exhausted and pressurised. Correspondingly, the primary pistons 128a, 128b and so primary piston pushrods 144a, 144b are cycled between the open position (ESD valve open during normal operation) and a Partial Stroke Test position (primary pistons 128a, 128b limited by backstop piston pushrods 140a, 140b and ESD valve closed by 10°-15°. During the cycling sequence, data is recorded in a memory (which may form part of the controller 7) regarding the time taken to complete a Partial Stroke Test stroke. This data is recorded for each cycle. A stuck ESD valve will initially take longer to free, or undergo a Partial Stroke Test stroke, than a freely moveable ESD valve.

After the Partial Stroke Test has occurred, a final step whereby the backstop pistons 132a, 132b are removed from their Partial Stroke Test position occurs. Backstop piston control valves 112, 114 are de-energised and the backstop pistons 132a, 132b and backstop piston pushrods 140a, 140b move outwards as confirmed by the backstop piston proximity sensors 136a, 136b.

Following the initial tests, engagement of the backstop pistons, Partial Stroke Test and removal of the backstop pistons, the Partial Stroke System 2 then returns to normal operation (FIG. 5a) whereby the independently controllable valves 30, 32, 34, 36 are all energised and backstop piston control valves 112, 114 are de-energised. Hence, the primary piston chambers 138a, 138b are pressurised and the backstop piston chambers 134a, 134b are exhausted.

The final mode of operation is the emergency shutdown or ESD mode as shown in FIG. 5c. Initially an ESD will be described from the starting position of the open configuration of the ESD valve actuator 124 as depicted in FIG. 5a. In this mode, the primary piston chambers 138a, 138b are pressurised which forces the primary pistons 128a, 128b (and so primary piston pushrods 144a, 144b) to an inward position, thereby compressing the springs 130a, 130b and also opening the ESD valve. The backstop piston chambers are exhausted so the backstop pistons 132a, 132b (and so backstop piston pushrods 140a, 140b) are at an outward position. In the ESD mode, both the primary piston chambers 138a, 138b and the backstop piston chambers 134a, 134b are exhausted. Upon exhausting the primary piston chambers 138a, 138b the compressed springs 130a, 130b uncoil and force the primary pistons 128a, 128b and primary piston pushrods 144a, 144b to an outward position as limited by the collars 142a, 142b. The outward motion of the primary piston pushrods 144a, 144b to an outward position causes rotation of the torque module 126 which in turn operates (closes) the ESD valve. This movement of the primary pistons 128a, 128b and so primary piston pushrods 144a, 144b to an extreme outer position is sufficient to rotate the torque module 126 and so the ESD valve through 90°. This causes a complete closure of the ESD valve. This sequence of events assumes the valve actuator 124 enters an ESD mode from a normal mode of operation whereby the backstop pistons 132a, 132b are already at the extreme outward position, as depicted in FIG. 5a.

An ESD will now be described from the starting position of the Partial Stroke Test mode of the ESD valve actuator 124 as depicted in FIG. 5b. In this mode, the primary piston chambers 138a, 138b are pressurised which forces the primary pistons 128a, 128b (and so primary piston pushrods 144a, 144b) to an inward position, thereby compressing the springs 130a, 130b and also opening the ESD valve. The backstop piston chambers are also pressurised so the backstop pistons 132a, 132b (and so backstop piston pushrods 140a, 140b) are at an inward position as limited by the collars 142a, 142b. If an ESD is required during a Partial Stroke Test, the backstop pistons 132a, 132b and backstop piston pushrods 140a, 140b must also be retracted to their outward position. In the event an ESD is required during a Partial Stroke Test, the backstop piston chambers 134a, 134b will be exhausted from their previously pressurised state. As the backstop piston chambers 134a, 134b are exhausted, the backstop pistons 132a, 132b and backstop piston pushrods 140a, 140b are free to move outwards. As above, the outward movement of the primary pistons 128a, 128b and primary piston pushrods 144a, 144b causes the torque module 126 to rotate which in turn leads to a rotational movement of the ESD valve. This movement of the primary pistons 128a, 128b and so primary piston pushrods 144a, 144b to an extreme outer position rotates the torque module 126 and so the ESD valve through 90°. This leads to a complete closure of the ESD valve in an ESD operation during a Partial Stroke Test.

It will be appreciated that numerous modifications to the above described design may be made without departing from the scope of the invention as defined by the appended claims. For instance, the inlet valve arrangement could comprise two independently controllable ball valves, with the valve system feed channel dividing into two channels upstream of the valve system.

Although the working fluid in the device as depicted is air, this could be exchanged for another fluid such as water with small modifications to some components (e.g. replacing the breathers with ports connected to a water tank).

The pair of channels in the valve system could also be modified to include additional channels in parallel to provide further redundancy.

The motion limiting collars of the ESD valve actuator could be exchanged for an alternative motion-limiting feature (e.g. a flange which projects inwardly from the piston housing).

The first and the second channels 26, 28 may be provided in a single body. Alternatively, the first and second channels 26, 28 may be formed by modular bodies connected in series. Each individual modular body forming the series may include a portion of both the first and the second channels 26, 28. A modular system is described in GB2475192 which is incorporated herein by reference. The modular system of GB2475192 may be modified by providing two channels in each modular body instead of a single channel.

Although the described embodiment includes the volume booster system 8, the shuttle valve outlet channel 48 may in an alternative embodiment be directly connected to the first and second primary piston feed channels 106, 108. This could be achieved by appropriately scaling the components in the valve system 6 for a larger flow rate which could operate the ESD valve actuator 124.

The described and illustrated embodiment is to be considered as illustrative and not restrictive in character, it being understood that only a preferred embodiment has been shown and described and that all changes and modifications that come within the scope of the inventions as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

The invention claimed is:

1. A valve system comprising:
   a first channel and a second channel in a parallel arrangement, each channel having an upstream end and a downstream end;
   an inlet valve arrangement connected to the upstream ends of the channels and configured to selectively allow the passage of a fluid through only the first channel, only the second channel, or through both channels;
   at least two independently controllable valves placed in a series arrangement along the first channel and at least two independently controllable valves placed in a series arrangement along the second channel; and
   a shuttle valve connected to downstream ends of the first and second channels, the shuttle valve comprising first and second inlet channels connected respectively to the first and second channels, a cavity, an outlet channel and a moveable element, the first and second inlet channels being in fluid communication with outlet channel via the cavity; wherein
   the moveable element is moveable within the cavity such that the position of the moveable element is determined by relative pressure levels in the first and second inlet channels, in a first position the movable element forming a seal between the moveable element and the first inlet channel, in a second position the moveable element forming a seal between the moveable element and the second inlet channel, and in a third position the moveable element being located between the first and second positions and allowing the passage of fluid from both the first and second channels.

2. The valve system of claim 1, wherein the moveable element is a ball.

3. The valve system of claim 1, wherein the first inlet channel and the second inlet channel are connected to outwardly tapering end surfaces of the cavity.

4. The valve system of claim 1, wherein the moveable element is located in a carriage which restricts movement of the moveable element to substantially a single direction.

5. The valve system of claim 1, wherein the first and second inlets are positioned such that the first and second inlets are at substantially the same height.

6. The valve system of claim 1, wherein pressure switches are placed downstream of the independently controllable valves.

7. The valve system of claim 1, wherein one or more volume boosters are connected downstream of the shuttle valve.

8. The valve system of claim 7, wherein an outlet channel from the one or more volume boosters is connected to primary pistons of a valve actuator.

9. The valve system of claim 1, wherein an outlet channel from the shuttle valve is connected to primary pistons of a valve actuator.

10. The valve system of claim 9, wherein the valve actuator is connected to an emergency shutdown valve.

11. The valve system of claim 8, further comprising a display configured to show the status of the system during a test and indicate the rotational position of the valve actuator.

12. The valve system of claim 1, further comprising a controller configured to control valves of the valve system.

13. The valve system of claim 12, wherein the controller includes a memory configured to store output data received during testing of the valve system.

14. The valve system of claim 1, the inlet valve arrangement, the individually controllable valves, and the shuttle are individually enclosed in explosion proof housings.

15. The valve system of claim 1, wherein one or more additional channels are connected in a parallel arrangement to the first and second channels.

16. A method of testing a valve system including a first channel and a second channel in a parallel arrangement, each channel having an upstream end and a downstream end; an inlet valve arrangement connected to the upstream ends of the channels and configured to selectively allow the passage of a fluid through only the first channel, only the second channel, or through both channels; at least two independently controllable valves placed in a series arrangement along the first channel and at least two independently controllable valves placed in a series arrangement along the second channel; and a shuttle valve connected to downstream ends of the first and second channels, the shuttle valve comprising first and second inlet channels connected respectively to the first and second channels, a cavity, an outlet channel and a moveable element, the first and second inlet channels being in fluid communication with outlet channel via the cavity; wherein the moveable element is moveable within the cavity such that the position of the moveable element is determined by relative pressure levels in the first and second inlet channels, in a first position the movable element forming a seal between the moveable element and the first inlet channel, in a second position the moveable element forming a seal between the moveable element and the second inlet channel, and in a third position the moveable element being located between the first and second positions and allowing the passage of fluid from both the first and second channels, and wherein pressure switches are placed downstream of the independently controllable valves, wherein the method comprises:
   actuating the inlet valve arrangement to allow the passage of fluid through both the first channel and the second channel;
   separately actuating the at least two independently controllable valves in the series arrangement along the first channel whilst monitoring the pressure switches downstream of those valves; and
   separately actuating the at least two independently controllable valves in the series arrangement along the second channel whilst monitoring the pressure switches downstream of those valves.

17. The method of claim 16, wherein the valve system forms part of a partial stroke system which further comprises backstop pistons of a valve actuator which are controlled by two backstop piston control valves, and wherein the method further comprises:
   energising both backstop piston control valves;
   de-energising and then energising one of the backstop piston control valves;
   de-energising and then energising the other backstop piston control valves; and
   de-energising both backstop piston control valves.

18. The method of claim 17, wherein the partial stroke system is connected to an emergency shutdown assembly which comprises an emergency shutdown valve controlled by primary pistons, the positions of the primary pistons being determined by the valve system, wherein the method further comprises:
  energising both backstop piston control valves;
  de-energising the independently controllable valves; and
  energising the independently controllable valves.

19. The method of claim 18, wherein the independently controllable valves are de-energised then energised a plurality of times.

20. The method of claim 19, wherein, once de-energising and energising the independently controllable valves has been completed, the backstop piston control valves are de-energised.

* * * * *